US012537275B2

(12) United States Patent
Bilogurov et al.

(10) Patent No.: US 12,537,275 B2
(45) Date of Patent: Jan. 27, 2026

(54) THERMAL ISOLATOR FOR MICROWAVE COMPONENTS WITH WAVEGUIDE FLANGES

(71) Applicant: Lisa Dräxlmaier GmbH, Vilsbiburg (DE)

(72) Inventors: Ievgen Bilogurov, Sindelfingen (DE); Thomas Merk, Stuttgart (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 123 days.

(21) Appl. No.: 18/654,673

(22) Filed: May 3, 2024

(65) Prior Publication Data

US 2024/0291128 A1 Aug. 29, 2024

Related U.S. Application Data

(63) Continuation of application No. PCT/EP2022/081780, filed on Nov. 14, 2022.

(30) Foreign Application Priority Data

Nov. 30, 2021 (GB) ..................................... 2117286

(51) Int. Cl.
*H01P 1/04* (2006.01)
*H01P 1/30* (2006.01)
*H01P 3/16* (2006.01)

(52) U.S. Cl.
CPC ................ *H01P 1/30* (2013.01); *H01P 1/042* (2013.01); *H01P 3/16* (2013.01)

(58) Field of Classification Search
CPC .. H01P 1/042; H01P 1/04; H01P 5/024; H01P 5/022; H01P 5/00; H01P 5/02; H01P 1/2005
See application file for complete search history.

(56) References Cited

U.S. PATENT DOCUMENTS

| 8,693,828 B2 | 4/2014 | Wollack et al. |
| 9,419,319 B1 | 8/2016 | Wollack et al. |

(Continued)

FOREIGN PATENT DOCUMENTS

| CN | 111710940 A | 9/2020 |
| EP | 1863114 A1 | 12/2007 |

(Continued)

OTHER PUBLICATIONS

International Search Report issued in corresponding International Application PCT/EP2022/081780, mailed Mar. 9, 2023.

(Continued)

*Primary Examiner* — Stephen E. Jones
(74) *Attorney, Agent, or Firm* — Burris Law, PLLC

(57) ABSTRACT

A waveguide spacer for thermally decoupling a first flange member from a second flange member of a waveguide structure for guiding high frequency radio waves, the waveguide spacer includes a band-gap layer composed of a dielectric substrate and a plurality of electrically conductive contacts inserted into the substrate. The substrate has a waveguide hole connecting opposite sides of the substrate and the contacts are arranged around the waveguide hole to form a band-gap structure. The waveguide spacer includes a dielectric first outer layer for contacting the first flange member. The first outer layer at least partially covers a first side of the band-gap layer. The waveguide spacer further includes an electrically conductive second outer layer for contacting the second flange member. The second outer layer at least partially covers a second side of the band-gap layer and is electrically connected to each contact.

18 Claims, 3 Drawing Sheets

(56) References Cited

U.S. PATENT DOCUMENTS

2008/0266026 A1 10/2008 Han et al.
2019/0123411 A1 4/2019 Carlred et al.

FOREIGN PATENT DOCUMENTS

JP 2005192038 A 7/2005
JP 2015185992 A 10/2015

OTHER PUBLICATIONS

Rodini, et al., A Contactless Measurement of the Surface Impedance of a Thin Sheet of Material, XXXIVTH General Assembly and Scientific Symposium of the International Union of Radio Science (URSI GASS), Aug. 28-Sep. 4, 2021, 4 pages, U.R.S.I., Italy.
Combined Search & Exam Report, Search Report, and IPO Letter issued in corresponding GB Application 2117286.1, issued May 13, 2022, 7 pages.

THERMAL ISOLATOR FOR MICROWAVE COMPONENTS WITH WAVEGUIDE FLANGES

CROSS-REFERENCE TO RELATED APPLICATIONS

This application is a continuation of International Application No. PCT/EP2022/081780, filed on Nov. 14, 2022, which claims priority to and the benefit of GB 2117286.1, filed on Nov. 30, 2021. The disclosure of each of the above referenced applications is incorporated herein by reference.

FIELD

The present disclosure relates to a waveguide spacer. The present disclosure further relates to a waveguide structure for guiding high frequency radio waves.

BACKGROUND

The statements in this section merely provide background information related to the present disclosure and may not constitute prior art.

Waveguides are generally used for guiding radio frequencies between transmitters and receivers and their antennas, for example, in microwave ovens, radar sets, satellite communications, and microwave radio links. A waveguide may be realized as a pipe with a waveguide flange at one or both of its ends for connecting the waveguide to another (waveguide) flange.

In a compact antenna design with high level of integration thermal isolation may be important. Temperature-sensitive devices with waveguide flanges, e.g., low noise amplifiers (LNA), may be affected. They tend to get hot due to convection and heat transfer over the air and due to heat transfer over flat metal-to-metal contact with hot objects. Increasing the temperature of an LNA may also increase its noise figure, which is one of the performance parameters of a receiving antenna and may determine the antenna system's gain over noise temperature ratio. An increased physical temperature may result in an increased LNA noise temperature, which may degrade both gain over noise temperature ratio and signal-to-noise ratio (SNR), i.e., the quality of the received signal.

For instance, in a receiving and transmitting antenna, a high power amplifier can utilize a metal body of the antenna as a heat dissipator or sink, but at the same time an LNA attached to the same aperture may also get hot.

Regarding radio frequency waveguides, it is usually not enough to put some low thermal conductivity material between a pair of waveguide flanges to interrupt heat flow. In this case, radio frequency surface currents inside the waveguide may also be interrupted and radiation from the seam may appear, thereby introducing unwanted losses.

One possibility for thermally decoupling two waveguide flanges from each other is to separate them by a small air gap using an external support structure.

U.S. Pat. No. 8,693,828 B2 describes a pair of waveguide flanges, where one of the flanges has a milled band-gap structure to avoid radiation losses at a gap between the two flanges.

SUMMARY

This section provides a general summary of the disclosure and is not a comprehensive disclosure of its full scope or all of its features.

The present disclosure provides a space-saving means for thermally decoupling two waveguide flanges from each other. Additionally, the present disclosure provides a way to reduce radiation losses in a waveguide structure. The present disclosure provides a hermetic seal at the junction of two waveguide flanges without having to change any of the waveguide flanges.

One aspect of the present disclosure relates to a waveguide spacer for thermally decoupling a first flange member from a second flange member of a waveguide structure for guiding high frequency radio waves. The waveguide spacer includes a band-gap layer composed of a dielectric substrate and a plurality of electrically conductive contacts inserted into the substrate, and the substrate has a waveguide hole connecting opposite sides of the substrate and the contacts are arranged around the waveguide hole to form a band-gap structure. The waveguide spacer further includes a dielectric first outer layer for contacting the first flange member and an electrically conductive second outer layer for contacting the second flange member. The first outer layer at least partially covers a first side of the band-gap layer. The second outer layer at least partially covers a second side of the band-gap layer and is electrically connected to each contact.

In general, a "flange member" may be a substantially flat and/or smooth surface with a circular, rectangular or square shape. Such a surface may also be referred to as electrically reflective. For example, the first and/or second flange member may be a metal surface. However, it is also possible that the first and/or second flange member is at least partially made of a dielectric material. The flange members may each comprise a waveguide port in the form of a hole, which may have a circular, rectangular or square shape. The flange members may be configured to be coupled together in such a way that the two waveguide ports face each other and/or that facing surfaces of the flange members are substantially parallel to each other.

The contacts may be inserted in such a way that each of them electrically connects a first side with a second side of the substrate, the first side and the second side being opposite sides of the substrate. In other words, each contact may be at least as long as the substrate is thick. The contacts may be metal contacts.

The substrate may be made of plastics and/or a typical PCB substrate material. In one example, the substrate may be made of an electrically isolating or dielectric material.

A waveguide hole may be a hole adapted for letting through radio frequencies which are to be transmitted between the first flange member and the second flange member. The shape and/or size of the waveguide hole may correspond to the shape and/or size of the waveguide ports. For example, the waveguide hole may have a rectangular shape if the waveguide ports each have a rectangular or quasi-rectangular or rounded rectangular shape. In one example, the waveguide hole may be a central opening in the substrate.

The band-gap structure may be seen as a periodic structure configured for suppressing microwave fields propagating between two parallel conducting surfaces, where one surface acts as an electric wall and the other surface acts as a magnetic wall. The electric wall may be a geometrically flat conductive plane with low impedance at the desired frequency of operation. The magnetic wall may be a 3 dimensionally shaped structure, providing a high impedance at the desired frequency of operation. The contacts may be spaced apart from each other in a specific pattern in dependence of the frequency bands to be blocked.

Another parameter is the thickness of the first outer layer since the gap between the first flange member and the band-gap structure determines how much heat will be transferred between the first flange member and the second flange member through the (metallic) contacts of the band-gap structure. The first outer layer should not be too thin. Otherwise, the thermal decoupling may not be sufficient. On the other hand, the first outer layer should not be too thick since this would increase radiation losses.

In other words, the properties of the band-gap structure may also be defined by the thickness of the outer layers. For example, the band-gap structure may not work if one or both outer layers are too thin.

At high frequencies, e.g. above 30 GHZ, for example around 100 GHz, it may be desired that the outer layers are thin, which may limit the effect of thermal isolation accordingly.

The first outer layer may be arranged around the waveguide hole without covering it and/or may at least cover the band-gap structure so that direct contact between the contacts and the first flange member is avoided when the waveguide spacer is mounted. The first outer layer may serve as a gasket between the band-gap layer and the first flange member, which both forms a hermetic seal and insulates electrically and/or thermally. For example, the first outer layer may be made of plastics.

The second outer layer may be configured for connecting each contact to electrical ground. Hence, the second outer layer may also be referred to as "ground plane". For example, the second outer layer may be a metal layer, such as copper foil, which is significantly thinner than the band-gap layer. The second outer layer may be arranged around the waveguide hole without covering it and/or may at least cover the band-gap structure. The second outer layer may also serve as a seal between the band-gap layer and the second flange member.

The two outer layers may be placed on opposite sides of the band-gap layer and/or of the substrate.

The waveguide spacer as described above and below reduces radiation out of the waveguide without the use of direct metal contact between the two flanges. In this way, heat transfer between the two flanges can be reduced. Furthermore, the gap between the two flanges can be hermetically sealed, which protects inner parts of the waveguide from moisture, dust, etc. Another advantage of the waveguide spacer is its compact and robust design. For example, the waveguide spacer can be used between any flat flanges, i.e., the flanges can be used as they are.

Another aspect of the present disclosure relates to a waveguide structure for guiding high frequency radio waves. The waveguide structure includes a first flange member having a first waveguide port, a second flange member having a second waveguide port and a waveguide spacer as described above and below. The waveguide spacer is arranged between the first flange member and the second flange member so that:
  the waveguide hole, the first waveguide port and the second waveguide port form a waveguide channel for guiding the high frequency radio waves;
  the first flange member is in direct contact with the first outer layer of the waveguide spacer;
  the second flange member is in direct contact with the second outer layer of the waveguide spacer.

The waveguide structure may be part of an antenna system adapted for transmitting and/or receiving high frequency signals, e.g., in the microwave range. Using the waveguide spacer in such a waveguide structure improves gain over noise temperature ratio and signal-to-noise ratio of the antenna system since the temperature of (low noise) amplifiers coupled to the waveguide structure can be significantly decreased.

Tests have shown that, when the waveguide spacer is placed between a heated metal antenna body and an LNA, the temperature of the LNA decreases by 18° C. given an ambient temperature of −20° C. and an air pressure of 18.6 kPa. Also, an averaged E field distribution around the waveguide spacer at 19 GHz did not show any significant leakage out of the device. In this example, a waveguide spacer with an overall thickness of 1.5 mm has been used.

According to one form of the present disclosure, the band-gap layer may be a printed circuit board. Additionally or alternatively the contacts may be vias, in one example, through-hole vias. In other words, the dielectric substrate of the band-gap layer may be a dielectric substrate of the printed circuit board, wherein the contacts may be vias, in one example, through-hole vias, of the printed circuit board. For example, the vias may be printed into and/or onto the substrate of the printed circuit board. This makes it possible to manufacture the waveguide spacer in large numbers at relatively low costs.

According to one form of the present disclosure, each contact may include a tube and a pad, wherein the tube may be connected at its first end to the pad and at its second end to the second outer layer. For example, the tube may be provided by plating the inner surface of a small hole through the substrate with metal, e.g., copper. The pad may be provided in a similar way, e.g., by plating a circular portion of an outer surface of the substrate with metal. The tube may go all the way through the substrate to provide a through-connection. The tube and the pad may be part of a via which electrically interconnects a top side and a bottom side of a printed circuit board. It may also be that the tube is connected at each of its ends to such a pad, wherein the two pads of each tube are arranged on opposite sides of the substrate. This facilitates the manufacturing of the band-gap structure.

According to one form of the present disclosure, the pad may be adjacent to an outer surface of the substrate and may be covered by the first outer layer. In other words, the pad of each contact may have been applied onto the outer surface of the substrate, wherein the first outer layer may cover the applied pads and/or at least a portion of the outer surface around the applied pads. The pads may be spaced apart from each other so that they do not touch each other. Additionally, the pads may be electrically grounded, for example, through the second outer layer. In this way, a magnetic wall in the form of a mushroom structure can be realized. Tests have shown that this type of band-gap structure is efficient.

According to one form of the present disclosure, the waveguide hole may be surrounded by at least a first row of contacts and a second row of contacts. The first and second rows of contacts may be ring-like and may be arranged concentrically. The contacts of different rows may be offset to one another with respect to a circumferential and/or radial direction of the waveguide hole. The first row may be an inner row and the second row may be an outer row. In other words, the first row may be arranged between the second row and a border of the waveguide hole. It may be that the second row is not the outermost row. For example, the waveguide hole may be surrounded by a third row of contacts, wherein the second row may be arranged between the first row and the third row. This form further improves the efficiency of the band-gap structure.

According to one form of the present disclosure, a number of contacts forming the first row differs from a number of contacts forming the second row. For example, the numbers may differ by at least one, five or even ten contacts. It is possible that a row which is closer to the waveguide hole, e.g., the first row, has less contacts than a row which is further away from the waveguide hole, e.g., the second row, or vice versa. In this way, the distance between adjacent contacts of the first row may be kept essentially the same as between adjacent contacts of the second row.

According to one form of the present disclosure, a distance between adjacent contacts of the first row may differ from a distance between adjacent contacts of the second row. The contacts of the same row may be equally spaced apart from each other. This creates an offset between the contacts of the first row and the contacts of the second row with respect to a circumferential direction of the waveguide hole.

According to one form of the present disclosure, a distance between adjacent contacts of different rows may be greater than a distance between adjacent contacts of the same row. In other words, each contact of the second row may be placed further away from a border of the waveguide hole than each contact of the first row.

According to one form of the present disclosure, the contacts may be arranged symmetrically with respect to a center line of the waveguide hole. The center line may be seen as an imaginary line which runs through the midpoint of the waveguide hole and divides it in two identical halves. This further improves the efficiency of the band-gap structure.

According to one form of the present disclosure, the contacts may be electrically connected with each other only through the second outer layer. As mentioned above, each contact may be connected at one of its ends, which may be the end of a tube, to the second outer layer, wherein the second outer layer is configured to be in direct contact with the second flange member, which may be a metal part, when the waveguide spacer is mounted. In other words, the second flange member may serve as ground, to which each contact is electrically connected through the second outer layer.

According to one form of the present disclosure, a sealing frame may at least partially surround the waveguide hole and/or the band-gap structure. The sealing frame may be a closed ring or a ring segment. Alternatively, the sealing frame may have a rectangular or square shape. The sealing frame may be made of metal and/or plastics and/or may have been printed onto an outer surface of the substrate. For example, the contacts of the band-gap-structure may be inserted into a portion of the substrate which is delimited on one side by an inner border of the sealing frame and on the other side by an outer border of the waveguide hole. This allows for a good seal between the waveguide spacer and the first flange member.

According to one form of the present disclosure, the waveguide spacer may have an overall thickness greater than 0.5 mm, in one example greater than 0.7 mm, and/or smaller than 5 mm, in one example smaller than 2 mm. Tests with Ka band antennas have shown that the overall thickness should be greater than 0.5 mm. Otherwise, the above mentioned blocking effect of the band-gap structure may be too weak. A similar deterioration of the blocking effect could be shown at an overall thickness greater than 5 mm.

Further benefits and advantages of the present disclosure will become apparent after a careful reading of the detailed description with appropriate reference to the accompanying drawings.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
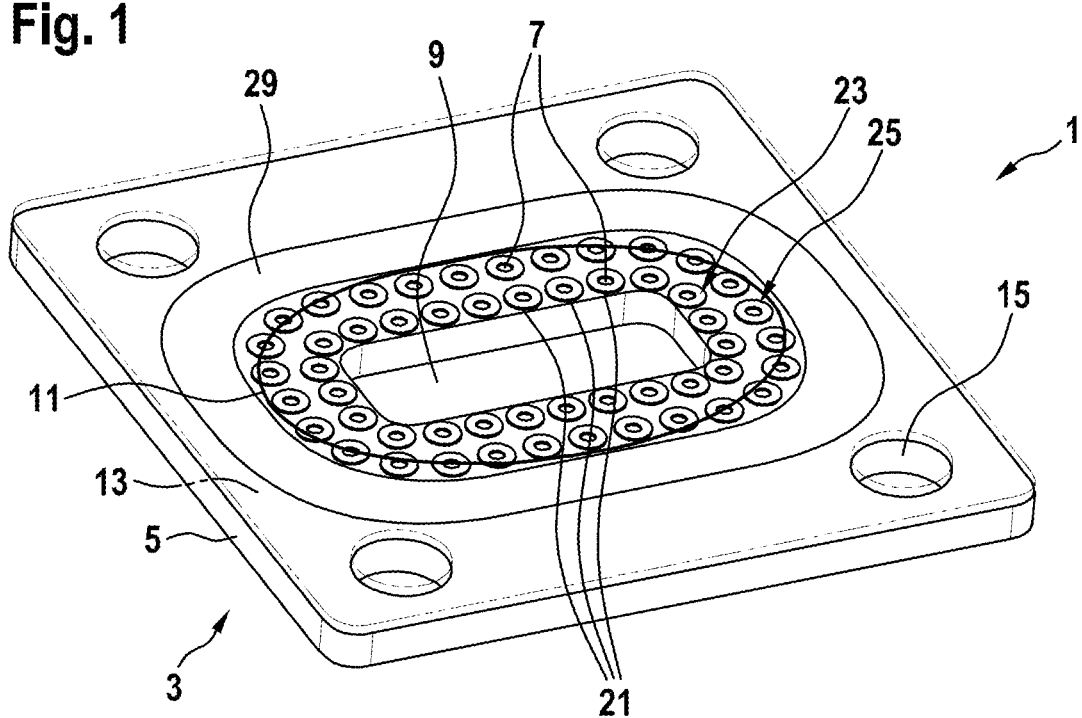
FIG. 1 shows a perspective view of a waveguide spacer according to one form of the present disclosure from the top.

The figures are merely schematic and not to scale. Identical reference signs in the various drawings denote identical or identically acting features.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a waveguide spacer 1 which comprises a band-gap layer 3 composed of a dielectric substrate 5 and a plurality of electrically conductive contacts 7 which are inserted into the substrate 5. The substrate 5 has a waveguide hole 9 for guiding radio waves through the substrate 5. The contacts 7 are arranged around the waveguide hole 9 in such a way that a band-gap structure 11 (marked with an oval ring) is formed around the waveguide hole 9.

The top side of the substrate 5 may be covered almost entirely by a dielectric first outer layer 13, except for the waveguide hole 9 and additional screw holes 15 through the substrate 5, these screw holes 15 being arranged outside of the band-gap structure 11.

Figure 2:
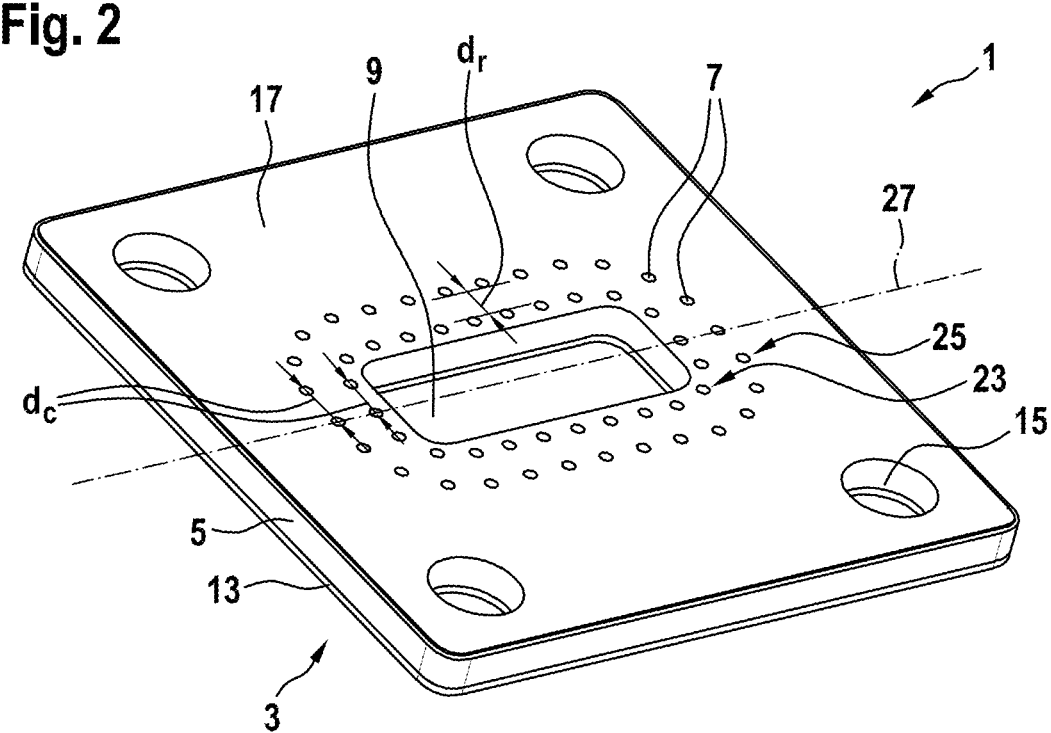
FIG. 2 shows a perspective view of the waveguide spacer of FIG. 1 from the bottom according to the present disclosure.

As shown in FIG. 2, the bottom side of the substrate 5 may be covered by an electrically conductive second outer layer 17, which is electrically connected to each of the contacts 7 of the band-gap structure 11. Like the first outer layer 13 at the top side of the substrate 5, the second outer layer 17 may cover nearly the entire bottom side of the substrate 5, except for the waveguide hole 9 and the screw holes 15.

The main purpose of the waveguide spacer 1 is to thermally isolate two flanges of a waveguide, e.g., of a microwave device. To avoid significant changes of the RF characteristics, the band-gap structure 11 is provided. The band-gap structure 11 may be configured as a combination of a magnetic wall and a separate electric wall, which inhibits propagation of electromagnetic waves through a gap between the two flanges.

As described below, the magnetic wall may be provided in the form of a mushroom structure, which may comprise vias connected to a common ground plane on one side of a PCB and open-circuit via pads placed on the opposite sides of the PCB. The electric wall may be provided by one of the two flanges, e.g., the flange of an LNA attached to the waveguide spacer 1. The material used to separate both walls, thereby creating a "gap", may be any type of PCB substrate or plastic material.

The band-gap layer 3 may be realized as a printed circuit board and the contacts 7 may be realized as through-hole vias connecting the top side with the bottom side of the substrate 5, i.e., the substrate 5 of the printed circuit board.

Figure 4:
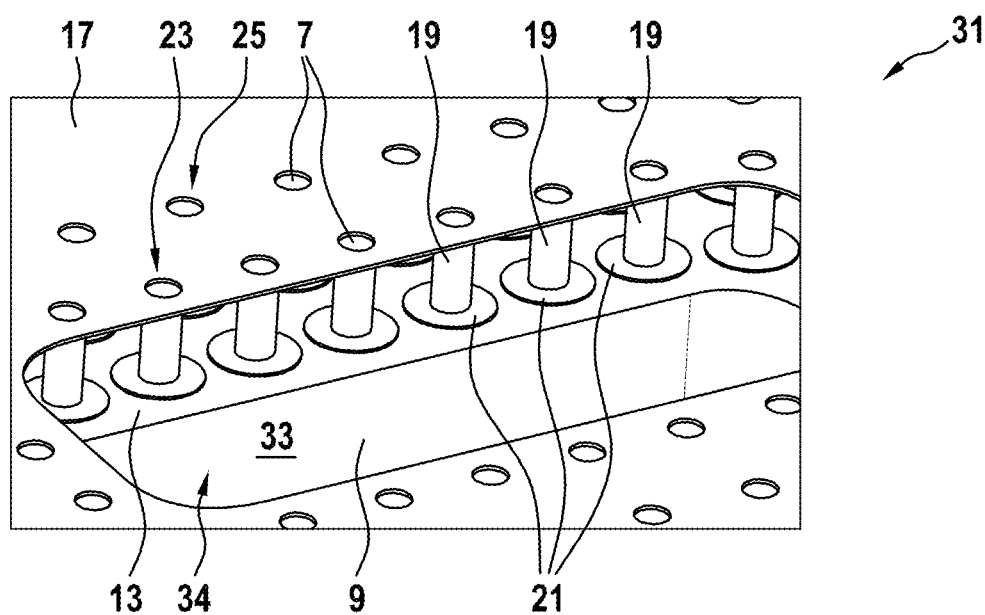
FIG. 4 shows a perspective view of some details of the mounted waveguide spacer of FIG. 3 according to the present disclosure.

As shown in more detail in FIG. 4, each of the contacts 7 may comprise a via tube 19 and a via pad 21 connected to a first end of the tube 19. A second end of the tube 19 may be connected to the second outer layer 17, which may be a ground plane of the printed circuit board. For better visibility, the substrate 5 is not shown in FIG. 4.

Referring to FIG. 1, the pads 21 may be placed onto the top side of the substrate 5 and may be covered by the first outer layer 13.

The contacts 7 may be electrically interconnected exclusively via the second outer layer 17.

Furthermore, the contacts 7 may be arranged in at least two rows around the waveguide hole 9. In this example, the band-gap structure 11 comprises an inner first row 23 of contacts 7 and an outer second row 25 of contacts 7. Depending on the frequency bands to be blocked, the contacts 7 may be arranged in a specific pattern within the rows 23, 25.

For example, as shown here, the number of contacts 7 of the first row 23 may be slightly smaller than the number of contacts 7 of the second row 25. Also, a distance $d_r$ between the two rows 23, 25 may be greater than a distance $d_c$ between adjacent contacts 7 of the first row 23 and/or the second row 25. However, the inverse case is also possible.

In this example, the distance between adjacent contacts 7 of the first row 23 is more or less the same as between adjacent contacts 7 of the second row 25. However, it is also possible that theses distances significantly differ from each other.

To further improve the band-gap structure 11, the contacts 7 may be arranged symmetrically with respect to a center line 27 of the waveguide hole 9.

The waveguide hole 9 may have a rectangular or square shape.

The waveguide hole 9 as well as the band-gap structure 11 may both be surrounded by a sealing frame 29. As exemplarily shown in FIG. 1, the sealing frame 29 may be provided in the form of a closed ring-shaped metal layer. It is possible that the sealing frame 29 has been applied onto the top side of the substrate 5 in the same or a similar way as the pads 21, e.g., by printing or plating, and is entirely covered by the first outer layer 13.

Figure 3:
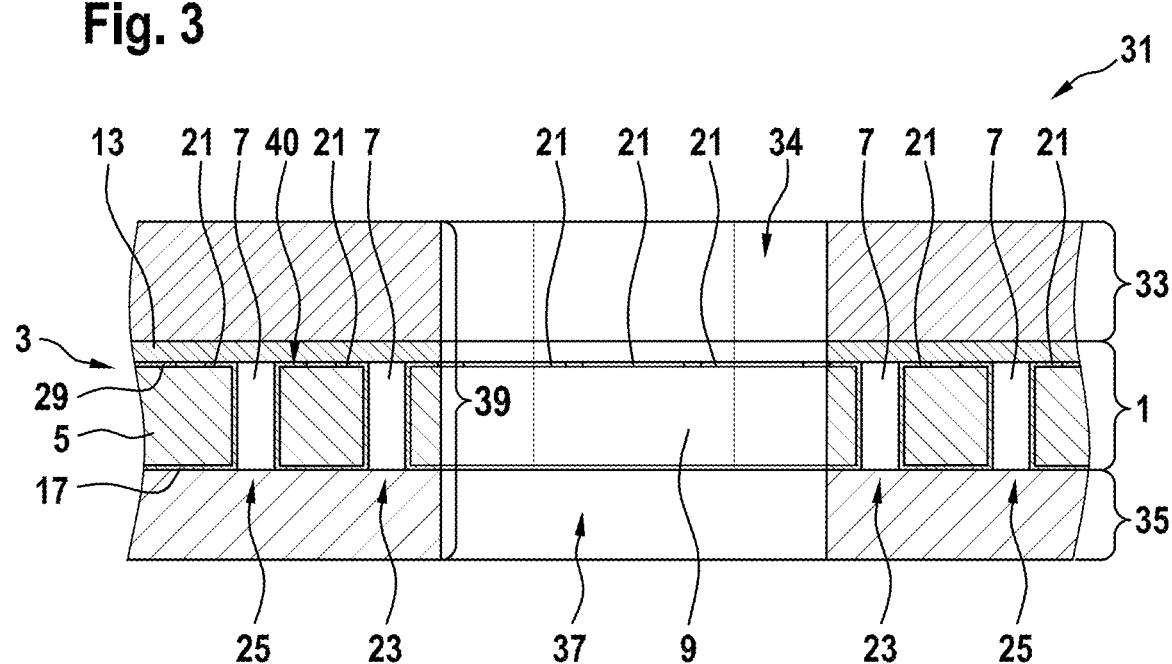
FIG. 3 shows a cross section view of the waveguide spacer of FIG. 1 and FIG. 2 mounted in a waveguide structure according to one form of the present disclosure.

FIG. 3 shows a waveguide structure 31 for guiding high frequency radio waves, such as microwaves. The waveguide structure 31 comprises a first flange member 33 with a first waveguide port 34 and a second flange member 35 with a second waveguide port 37. Both flange members 33, 35 may be metallic flanges. The waveguide spacer 1 is mounted between the flange members 33, 35 in such a way that the first outer layer 13 is in direct contact with a flat surface of the first flange member 33 and the second outer layer 17 is in direct contact with a flat surface of the second flange member 35. Furthermore, the waveguide hole 9 faces each of the waveguide ports 34, 37 so that a straight waveguide channel 39 for guiding the radio waves is formed.

The waveguide spacer 1 not only avoids radiation losses at the flange junction but also hermetically seals the waveguide channel 39.

For example, the two flanges 33, 35 and the waveguide spacer 1 may be bolted together with screws through the screw holes 15.

The second outer layer 17 should have tight metal contact with the second flange member 35. Also, the sealing frame 29, which may be a printed metal ring, should have tight contact with the first flange member 33. This improves the sealing of the waveguide structure 31 against moisture or dust.

FIG. 3 also shows that the pads 21 may be applied onto an outer surface 40 of the substrate 4, that is, placed between the outer surface 40 and the first outer layer 13.

Figure 5:
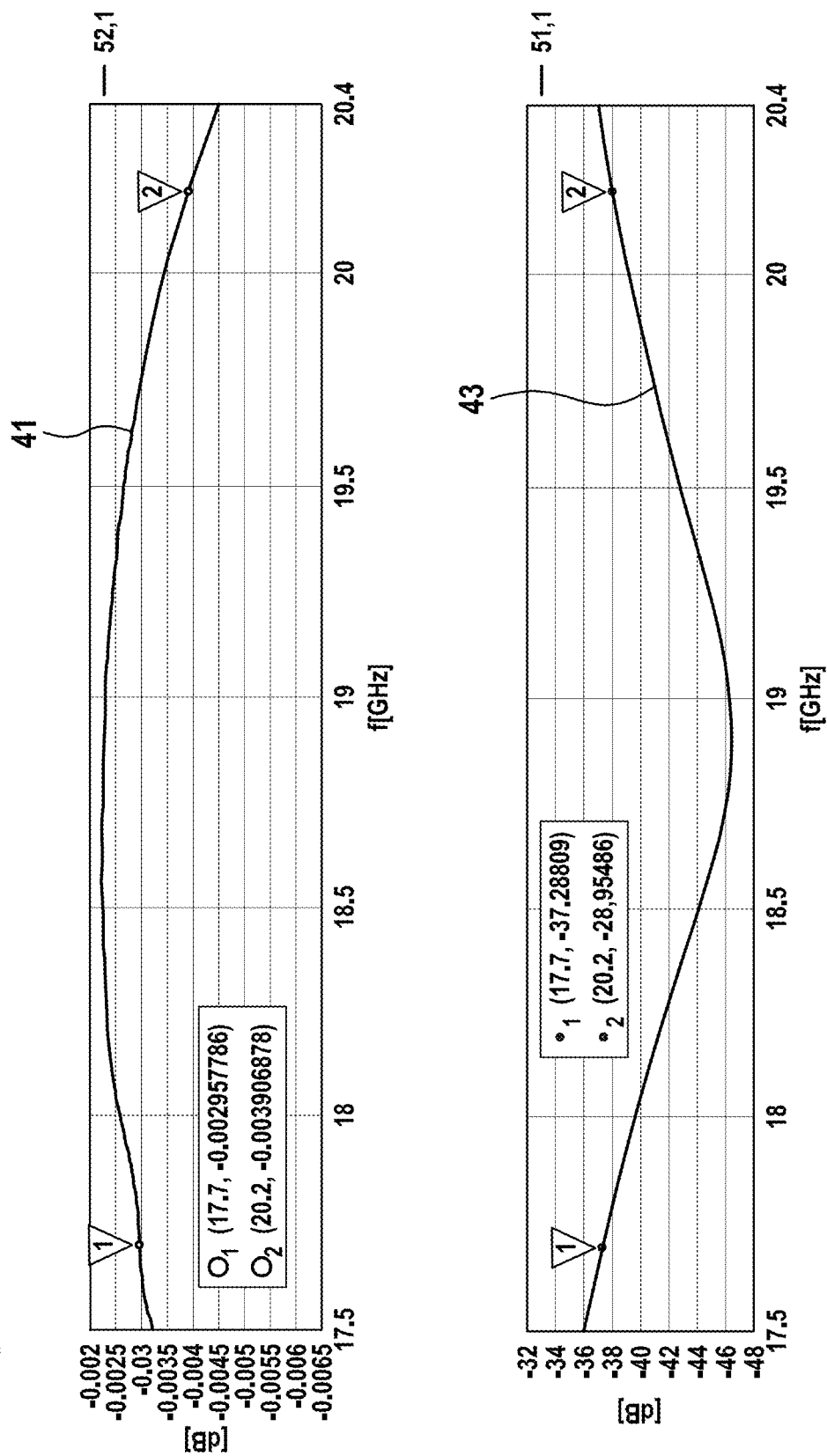
FIG. 5 shows two diagrams illustrating S-parameters of a waveguide spacer according to one form of the present disclosure.

Exemplary S-parameters of a waveguide spacer 1 are shown in FIG. 5 with respect to a Ka frequency band. The first diagram shows a transmission curve 41 illustrating a transmission of the waveguide spacer 1. The transmission is better than −0.004 dB. The second diagram shows a reflection curve 43 illustrating a reflection of the waveguide spacer 1. The reflection falls below −37 dB.

One advantage of the waveguide spacer 1 is the reduction of construction volume since a bulky passive cooler, e.g., on an LNA, may be omitted. When used with an LNA, the waveguide spacer 1 also helps to improve the LNA's noise figure due to reducing its temperature and, therefore, the gain over noise temperature ratio as well as the signal to noise ratio of the device.

The various forms described above are provided by way of illustration only and should not be construed to limit the present disclosure. It is to be understood that many other possible modifications and variations can be made without departing from the scope of the present disclosure. It is, therefore, contemplated that the appended claim or claims will cover such modifications and variations that fall within the true scope of the present disclosure.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A waveguide spacer for thermally decoupling a first flange member from a second flange member of a waveguide structure for guiding high frequency radio waves, the waveguide spacer comprising:
    a band-gap layer composed of a dielectric substrate and a plurality of electrically conductive contacts inserted into the dielectric substrate, the dielectric substrate has a waveguide hole connecting opposite sides of the dielectric substrate and the plurality of electrically conductive contacts are arranged around the waveguide hole to form a band-gap structure;
    a dielectric first outer layer for contacting the first flange member, and the dielectric first outer layer at least partially covers a first side of the band-gap layer; and
    an electrically conductive second outer layer for contacting the second flange member, the electrically conductive second outer layer at least partially covers a second side of the band-gap layer and is electrically connected to each electrically conductive contact of the plurality of electrically conductive contacts.

2. The waveguide spacer of claim 1, wherein the band-gap layer is a printed circuit board.

3. The waveguide spacer of claim 2, wherein the plurality of electrically conductive contacts comprise vias.

4. The waveguide spacer of claim 2, wherein the plurality of electrically conductive contacts comprise through-hole vias.

5. The waveguide spacer of claim 1, wherein each electrically conductive contact of the plurality of electrically conductive contacts comprises a tube and a pad, the tube has a first end and a second end, the first end of the tube is coupled to the pad and the second end of the tube is coupled to the electrically conductive second outer layer.

6. The waveguide spacer of claim 5, wherein the pad is adjacent to an outer surface of the dielectric substrate and is covered by the dielectric first outer layer.

7. The waveguide spacer of claim 1, wherein the waveguide hole is surrounded by at least a first row of the plurality of electrically conductive contacts and a second row of the plurality of electrically conductive contacts.

8. The waveguide spacer of claim 7, wherein a first number of the plurality of electrically conductive contacts forming the first row differs from a second number of the plurality of electrically conductive contacts forming the second row.

9. The waveguide spacer of claim 7, wherein a first distance between adjacent electrically conductive contacts of the first row differs from a second distance between adjacent electrically conductive contacts of the second row.

10. The waveguide spacer of claim 9, wherein a third distance defined between adjacent electrically conductive contacts of the first row and the second row is greater than at least one of the first distance and the second distance.

11. The waveguide spacer of claim 1, wherein the plurality of electrically conductive contacts are arranged symmetrically with respect to a center line of the waveguide hole.

12. The waveguide spacer of claim 1, wherein the plurality of electrically conductive contacts are electrically connected with each other through the electrically conductive second outer layer.

13. The waveguide spacer of claim 1, wherein a sealing frame at least partially surrounds at least one of the waveguide hole and the band-gap structure.

14. The waveguide spacer of claim 1, wherein the waveguide spacer has an overall thickness greater than 0.5 mm.

15. The waveguide spacer of claim 14, wherein the waveguide spacer has an overall thickness smaller than 5 mm.

16. The waveguide spacer of claim 14, wherein the waveguide spacer has an overall thickness smaller than 2 mm.

17. The waveguide spacer of claim 1, wherein the waveguide spacer has an overall thickness greater than 0.7 mm.

18. A waveguide structure for guiding high frequency radio waves, the waveguide structure comprising:
    a first flange member having a first waveguide port;
    a second flange member having a second waveguide port; and
    a waveguide spacer that includes:
        a band-gap layer composed of a dielectric substrate and a plurality of electrically conductive contacts inserted into the dielectric substrate, the dielectric substrate has a waveguide hole connecting opposite sides of the dielectric substrate and the plurality of electrically conductive contacts are arranged around the waveguide hole to form a band-gap structure;
        a dielectric first outer layer for contacting the first flange member, and the dielectric first outer layer at least partially covers a first side of the band-gap layer; and
        an electrically conductive second outer layer for contacting the second flange member, the electrically conductive second outer layer at least partially covers a second side of the band-gap layer and is electrically connected to each electrically conductive contact of the plurality of electrically conductive contacts, and the waveguide spacer is arranged between the first flange member and the second flange member so that the waveguide hole, the first waveguide port and the second waveguide port form a waveguide channel for guiding the high frequency radio waves, the first flange member is in direct contact with the dielectric first outer layer of the waveguide spacer, and the second flange member is in direct contact with the electrically conductive second outer layer of the waveguide spacer.

* * * * *